United States Patent
Watanabe et al.

(10) Patent No.: US 11,960,250 B2
(45) Date of Patent: Apr. 16, 2024

(54) ELECTRIC POWER CONVERSION APPARATUS HAVING A CONTROLLER THAT SWITCHES A CONTROL SCHEME OF A MAIN CIRCUIT

(71) Applicant: Mitsubishi Electric Corporation, Tokyo (JP)

(72) Inventors: Shota Watanabe, Tokyo (JP); Tomokazu Sakashita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 69 days.

(21) Appl. No.: 17/777,630

(22) PCT Filed: Jan. 7, 2020

(86) PCT No.: PCT/JP2020/000191
§ 371 (c)(1),
(2) Date: May 18, 2022

(87) PCT Pub. No.: WO2021/140571
PCT Pub. Date: Jul. 15, 2021

(65) Prior Publication Data
US 2022/0413450 A1 Dec. 29, 2022

(51) Int. Cl.
*G06F 1/00* (2006.01)
*G05B 11/42* (2006.01)
*H02M 3/157* (2006.01)

(52) U.S. Cl.
CPC .............. *G05B 11/42* (2013.01); *H02M 3/157* (2013.01)

(58) Field of Classification Search
CPC ...... G05B 11/42; H02M 3/157; H02M 3/1566; H02M 3/156
See application file for complete search history.

(56) References Cited

U.S. PATENT DOCUMENTS

| | | | |
|---|---|---|---|
| 2016/0004285 A1* | 1/2016 | Tsai | G06F 1/305 713/300 |
| 2020/0233316 A1 | 7/2020 | Asano et al. | |
| 2020/0373836 A1 | 11/2020 | Nagato et al. | |

FOREIGN PATENT DOCUMENTS

| | | |
|---|---|---|
| JP | 2019-71405 A | 5/2019 |
| WO | 2019/159504 A1 | 8/2019 |

OTHER PUBLICATIONS

"WIPO", English Translation, Aug. 22, 2019 (Year: 2019).*
(Continued)

*Primary Examiner* — Nitin C Patel
(74) *Attorney, Agent, or Firm* — XSENSUS LLP

(57) ABSTRACT

A main circuit includes a switching element, and converts electric power input to the main circuit and supplies a result of the conversion to a load. The controller switches a control scheme of the main circuit from a first control scheme to a second control scheme at a first time point when the output value starts to vary and switches the control scheme of the main circuit from the second control scheme to the first control scheme at a second time point when a determination is made that switching of a variation direction of the output value will occur on the basis of a detection value of the detector.

15 Claims, 8 Drawing Sheets

(56) References Cited

OTHER PUBLICATIONS

International Search Report and Written Opinion dated Mar. 10, 2020, received for PCT Application PCT/JP2020/000191, Filed on Jan. 7, 2020, 9 pages including English Translation.
Maruta et al., "Transient Response of Reference Modified Digital PID Control DC-DC Converters with Neural Network Prediction", IEICE Trans. Commun., vol. E99-B, No. 11, Nov. 2016, pp. 2340-2350.

* cited by examiner

| CONTROL METHOD | Cm1 | Cm2 | Cm3 | Cm4 | Cm5 |
|---|---|---|---|---|---|
| NORMAL FEEDBACK CONTROL | YES | YES | YES | YES | YES |
| FEEDBACK CONTROL WITH CORRECTION | NO | YES | YES | YES | YES |
| ADJUSTMENT OF INTEGRAL TERM | NO | YES | NO | YES | YES |
| DETERMINATION OF VARIATION POINT | NO | TWO PREDICTION VALUES | TWO DETECTION VALUES | TWO DETECTION VALUES | PREDICTION VALUE AND DETECTION VALUE |

ELECTRIC POWER CONVERSION APPARATUS HAVING A CONTROLLER THAT SWITCHES A CONTROL SCHEME OF A MAIN CIRCUIT

CROSS-REFERENCE TO RELATED APPLICATION

The present application is based on PCT filing PCT/JP2020/000191, filed Jan. 7, 2020, the entire contents of which are incorporated herein by reference.

TECHNICAL FIELD

The present disclosure relates to an electric power conversion apparatus.

BACKGROUND ART

The feedback control device disclosed in PTL 1 includes a first control unit that outputs a manipulated variable for a controlled object in response to input of information on a control deviation between a process variable and a desired setpoint of the controlled object, a second control unit including a learning control unit having a parameter used for outputting the manipulated variable for the controlled object determined by machine learning, an adder that adds a first manipulated variable output from the first control unit and a second manipulated variable output from the second control unit and outputs the resultant manipulated variable to the controlled object, and a limiter that limits the second manipulated variable output from the second control unit.

CITATION LIST

Patent Literature

PTL 1: Japanese Patent Laying-Open No. 2019-71405

SUMMARY OF INVENTION

Technical Problem

For example, when the controlled object is an output voltage or an output current, the output voltage or the output current varies in a manner that depends on various factors such as load variation or noise. The magnitude of the variation and the manipulated variable required for control vary in a manner that depends on the magnitude of generated load variation or the like. In the feedback control device disclosed PTL 1, the second manipulated variable output from the second control unit is limited by the limiter, so that it may be difficult to reduce, when the output voltage or the output current varies greatly, a variation in the output voltage or output current.

It is therefore an object of the present disclosure to provide an electric power conversion apparatus capable of reducing a variation in an output voltage or output current.

Solution to Problem

An electric power conversion apparatus according to the present disclosure includes a main circuit including a switching element, the main circuit to convert electric power input to the main circuit and supply a result of the conversion to a load, a detection detector to detect an output value of the main circuit, and a control device controller to control the main circuit. The output value of the main circuit is an output voltage of the main circuit or an output current of the main circuit. The control device controller switches a control scheme of the main circuit from a first control scheme to a second control scheme at a first time point when the output value starts to vary and switches the control scheme of the main circuit from the second control scheme to the first control scheme at a second time point when a determination is made that switching of a variation direction of the output value will occur on the basis of a detection value of the detector.

Advantageous Effects of Invention

According to the present disclosure, the controller switches the control scheme of the main circuit from the first control scheme to the second control scheme at the first time point when the output value starts to vary and switches the control scheme of the main circuit from the second control scheme to the first control scheme at the second time point when a determination is made that switching of the variation direction of the output value will occur on the basis of the detection value of the detector. This makes it possible to reduce a variation in the output voltage or output current.

DESCRIPTION OF EMBODIMENTS

Hereinafter, embodiments will be described with reference to the drawings.

First Embodiment

Figure 1:
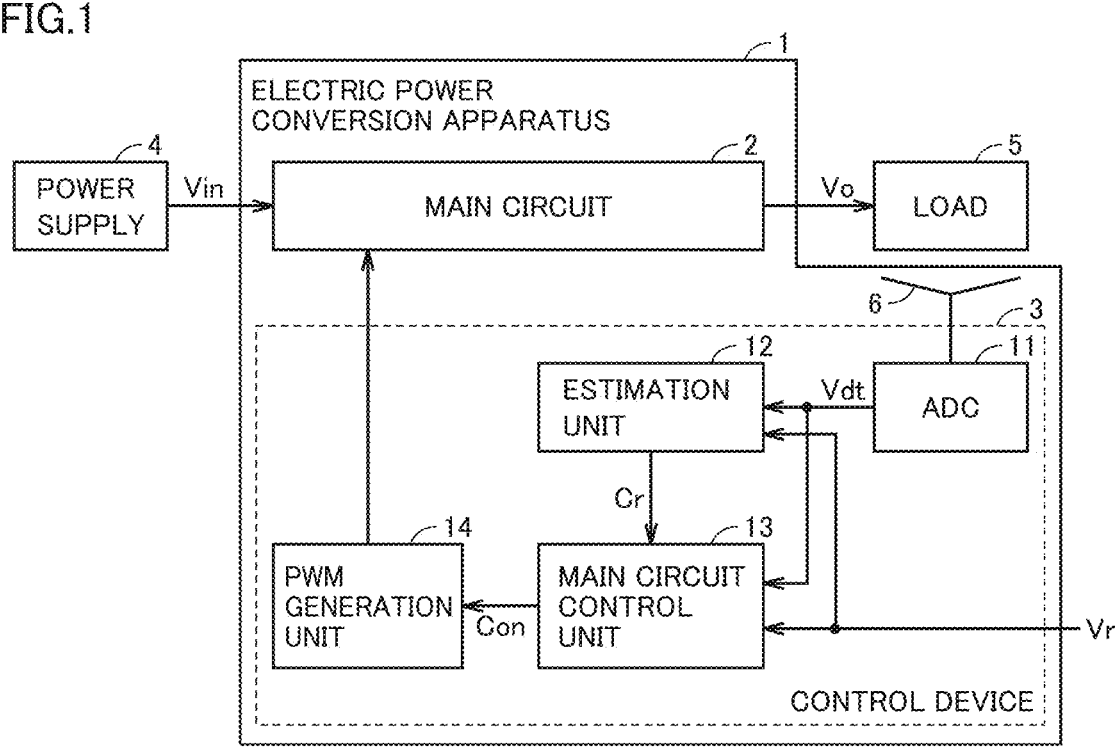
FIG. 1 is a diagram illustrating a configuration of an electric power conversion apparatus 1 according to a first embodiment.

FIG. 1 is a diagram illustrating a configuration of an electric power conversion apparatus 1 according to a first embodiment.

Electric power conversion apparatus 1 includes a main circuit 2, a control device 3, and an output voltage detection unit 6. Main circuit 2 converts electric power input from a power supply 4 and supplies a result of the conversion to a load 5. Control device 3 controls main circuit 2. Output voltage detection unit 6 detects an output voltage of main circuit 2.

Electric power conversion apparatus 1 is applied to, for example, a headlamp apparatus or a laser beam machining apparatus. When electric power conversion apparatus 1 is applied to a headlamp apparatus, load 5 is a light emitting element such as an LED. When electric power conversion apparatus 1 is applied to a laser beam machining apparatus, load 5 is a laser diode, a discharge load, or the like.

Main circuit 2 is a switching circuit. The switching circuit includes a switching element that is driven by a pulse width modulation (PWM) signal generated by control device 3. The switching element is a field effect transistor (FET) element, an insulated gate bipolar transistor (IGBT) element, or the like. Main circuit 2 may have any configuration as long as main circuit 2 serves as a switching circuit.

Main circuit 2 may be a step-up chopper or a step-up/down chopper. Main circuit 2 may be an insulating circuit such as a flyback converter, an LLC converter, or a dual active bridge (DAB) converter. Main circuit 2 may be an AC/DC conversion circuit that converts AC into DC or a DC/AC conversion circuit that converts DC into AC.

Figure 2:
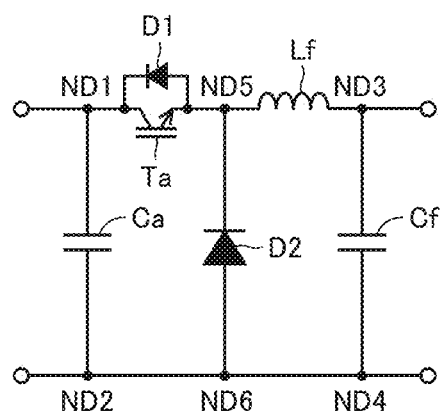
FIG. 2 is a diagram illustrating a step-down chopper that is an example of a main circuit 2.

FIG. 2 is a diagram illustrating a step-down chopper that is an example of main circuit 2.

The step-down chopper includes a switching element Ta, diodes D1, D2, capacitors Ca, Cf, and a coil Lf. Capacitor Ca is disposed between an input node ND1 and an input node ND2. Capacitor Cf is disposed between an output node ND3 and an output node ND4. Diode D2 is disposed between an intermediate node ND5 and an intermediate node ND6. Diode D1 and switching element Ta are arranged in parallel between input node ND1 and intermediate node ND5. Coil Lf is disposed between intermediate node ND5 and output node ND3.

Output voltage detection unit 6 detects an output voltage Vo of main circuit 2 and outputs a result of the detection to control device 3.

Control device 3 includes an ADC 11, an estimation unit 12, a main circuit control unit 13, and a PWM generation unit 14.

ADC 11 converts the output voltage detected by output voltage detection unit 6 into a digital value at sampling periods Ts to generate an output voltage detection value Vdt. ADC 11 outputs output voltage detection value Vdt to estimation unit 12 and main circuit control unit 13.

Estimation unit 12 determines whether output voltage Vo of main circuit 2 has varied (hereinafter, referred to as an output voltage variation) on the basis of an output voltage command value Vr and output voltage detection value Vdt output from ADC 11. When determining that the output voltage variation has occurred, estimation unit 12 outputs correction information Cr to main circuit control unit 13. Note that output voltage command value Vr may be input from the outside or may be held in control device 3.

Main circuit control unit 13 performs normal feedback control, feedback control with correction, and adjustment of an integral term of feedback control on the basis of output voltage command value Vr, output voltage detection value Vdt, and correction information Cr.

PWM generation unit 14 generates a PWM signal used for driving main circuit 2 on the basis of the output of main circuit control unit 13.

Control device 3 generates the PWM signal used for driving main circuit 2 so as to cause output voltage Vo of main circuit 2 to follow output voltage command value Vr. When the output voltage variation occurs, control device 3 increases the speed of response as compared with under a normal condition. The increase in the speed of response when the output voltage variation occurs is made by estimation unit 12 and main circuit control unit 13.

Next, details of estimation unit 12 will be described.

Estimation unit 12 outputs, as correction information Cr, an output voltage prediction value Vep over a period from the detection of the variation in output voltage Vo until the switching of the variation direction of output voltage Vo, otherwise outputs "0".

Estimation unit 12 generates output voltage prediction value Vep on the basis of past and current output voltage detection values Vdt. Estimation unit 12 predicts switching of the variation direction of output voltage Vo using output voltage prediction value Vep. The variation direction of output voltage Vo corresponds to a direction in which output voltage Vo rises (positive direction) or a direction in which output voltage Vo falls (negative direction). The switching of the variation direction corresponding to switching of the variation direction from the positive direction to the negative direction or from the negative direction to the positive direction. Estimation unit 12 can accurately predict the occurrence of the switching of the variation direction of output voltage Vo using output voltage prediction value Vep, so that it is possible to prevent a large-scale correction from being continuously applied for a long time under the feedback control with correction of main circuit control unit 13 (to be described later).

Figure 3:
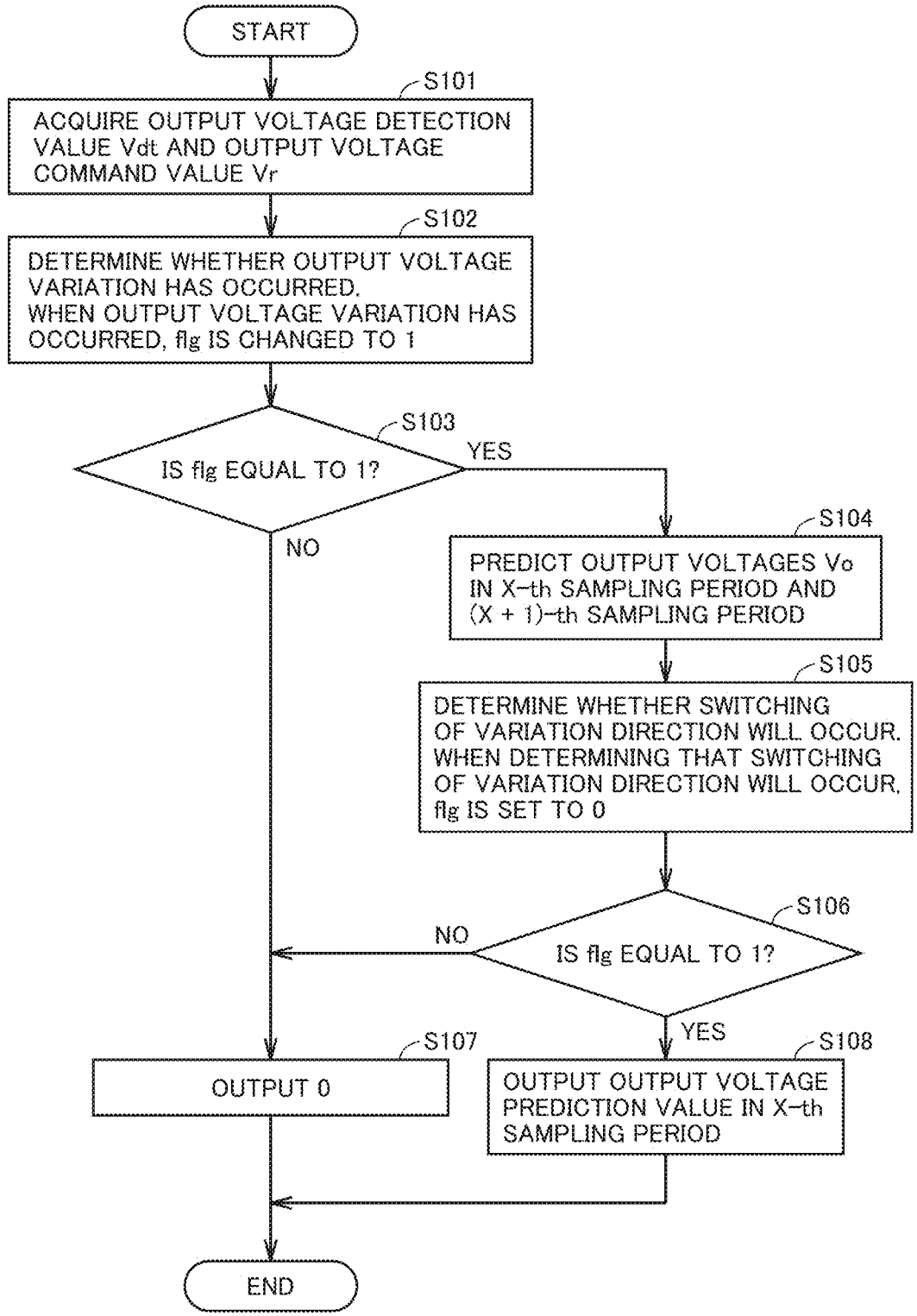
FIG. 3 is a flowchart illustrating a processing procedure of an estimation unit 12.

FIG. 3 is a flowchart illustrating a processing procedure of an estimation unit 12.

In step S101, estimation unit 12 acquires output voltage detection value Vdt and output voltage command value Vr.

In step S102, estimation unit 12 determines whether the output voltage variation has occurred on the basis of output voltage detection value Vdt. The determination as to whether the output voltage variation has occurred may be made by any method as long as output voltage detection value Vdt is used. For example, estimation unit 12 may determine that the output voltage variation has occurred when output voltage detection value Vdt has continuously varied a plurality of times in a direction in which a difference between output voltage detection value Vdt and output voltage command value Vr increases. Alternatively, estimation unit 12 may determine that the output voltage variation has occurred when the difference between output voltage detection value Vdt and output voltage command value Vr becomes greater than or equal to a threshold. When determining that the output voltage variation has occurred, estimation unit 12 changes a flag flg to "1". Note that, in S102, estimation unit 12 does not change flag fig to zero. Estimation unit 12 changes flag fig to zero in S105 (to be described later). When flag fig is already "1", step S102 may be skipped.

In step S103, estimation unit 12 determines whether flag flg is "0" or "1". When flag flg is "0", the processing proceeds to step S107, and when flag flg is "1", the processing proceeds to step S104.

In S104, estimation unit 12 predicts output voltage Vo in an X-th sampling period and an (X+1)-th sampling period from the current sampling period. Estimation unit 12 can predict output voltage Vo using an equation obtained by modeling electric power conversion apparatus 1, a function of simulating an output voltage waveform obtained when the output voltage variation occur, the output voltage waveform being prepared in advance, or a machine learning model that has been trained. In the following description, a neural network is used as the machine learning model, but the machine learning model is not limited to the neural network, and may be a support vector machine, a random forest, gradient boosting, or the like.

Figure 4:
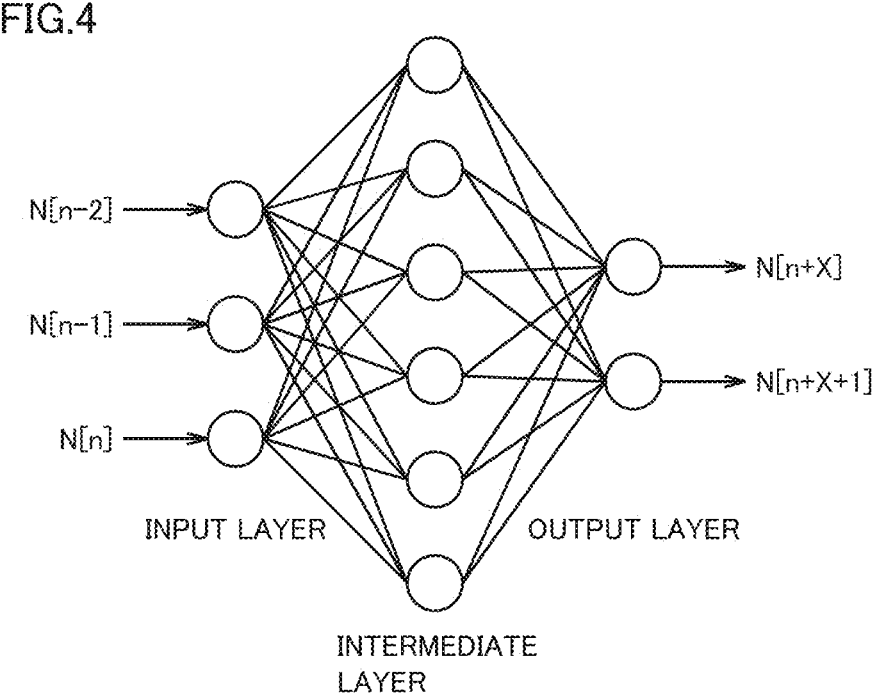
FIG. 4 is a diagram illustrating a neural network that predicts an output voltage.

FIG. 4 is a diagram illustrating a neural network that predicts an output voltage. The neural network has three layers in total. An input layer, an intermediate layer (hidden layer), and an output layer have three units, six units, and two units, respectively. The neural network may have two or more intermediate layers, and each layer may have any number of units, but it is required that the control of electric power conversion apparatus 1 be high in throughput, so that a small-scale model as illustrated in FIG. 4 is desirable.

A description will be given below of how the neural network operates.

To the input layer of the neural network, output voltage detection values $N[n-2]$, $N[n-1]$, and $N[n]$ corresponding to a total of three sampling points including the current sampling point and past two sampling points are input. n denotes the current sampling period. The output layer outputs an output voltage prediction value $N[n+X]$ in the X-th sampling period and an output voltage prediction value $N[n+X+1]$ in the (X+1)-th sampling period, the output voltage prediction values $N[n+X]$, $N[n+X+1]$ being estimated from the output voltage detection values corresponding to the three sampling points input to the input layer.

For example, X=1 may be set, but X it is not limited to X=1. It is desirable that the value of X be set in consideration of a system delay such as a delay occurring in feedback control and detection. For example, for a system with a delay of three sampling periods, X=3 may be set. Further, past three output voltage detection values without the current output voltage detection value may be input to the input layer of the neural network.

In step S105, estimation unit 12 uses output voltage prediction values $N[n+X]$ and $N[n+X+1]$ obtained in step S104 to determine whether the switching of the variation direction of output voltage Vo will occur.

Figure 5:
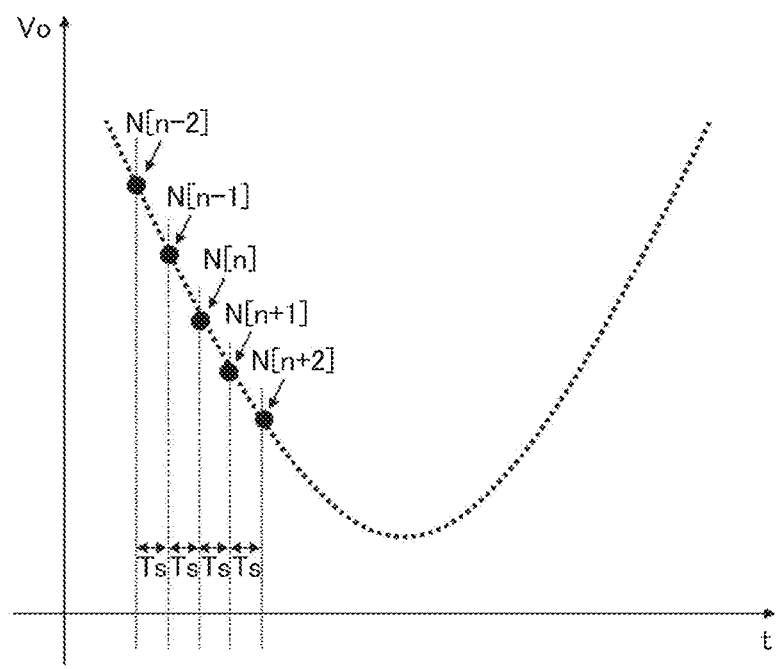
FIG. 5 is a diagram illustrating an example how an output voltage Vo varies.

FIG. 5 is a diagram illustrating an example how an output voltage Vo varies. A description will be given below with X=1.

In FIG. 5, at an initial stage, output voltage Vo varies downward. Therefore, a comparison between output voltage prediction value $N[n+1]$ in the next sampling period and output voltage prediction value $N[n+2]$ in a sampling period after the next sampling period results in $N[n+1]>N[n+2]$.

FIG. 5 shows that the variation direction of output voltage Vo is switched to an upward direction as time passes. That is, a comparison between output voltage prediction value $N[n+1]$ in the next sampling period and output voltage prediction value $N[n+2]$ in the sampling period after the next sampling period results in $N[n+1]>N[n+2]$. In this case, estimation unit 12 determines that the switching of the variation direction of output voltage Vo will occur.

When determining that the switching of the variation direction of output voltage Vo will occur, estimation unit 12 changes flag flg to "0". The reason why control device 3 switches control when it is determined that the switching of the variation direction of output voltage Vo will occur rather than when the switching of the variation direction of output voltage Vo occurs is because, after main circuit control unit 13 performs feedback computation, there are delays such as a delay in generating the PWM signal in PWM generation unit 14 and a delay in response in main circuit 2. Control device 3 switches control in advance in anticipation of such delays.

In step S106, when flag fig is "0", the processing proceeds to step S107, and when flag flg is "1", the processing proceeds to step S108.

In step S107, estimation unit 12 outputs "0".

In step S108, estimation unit 12 outputs output voltage prediction value $N[n+X]$ in the X-th sampling period predicted in S104 as correction information Cr. Note that, in S108, the value output from estimation unit 12 only needs to be a value predicted in step S104, and may be, for example, output voltage prediction value $N[n+X+1]$ in the (X+1)-th sampling period.

The order of the steps in the flowchart illustrated in FIG. 3 may be changed. For example, step S104 may be executed before step S102, but from the viewpoint of computational complexity, it is desirable that step S104 be executed after step S102 as illustrated in FIG. 3. Further, in step S104, any number of points may be predicted as long as two consecutive points are contained. In this case, the determination of the switching in step S105 may be made in any desired manner as long as the output voltage prediction value obtained in step S104 is used. That is, the determination may be modified in a manner that depends on the number of output voltage prediction values.

Note that the determination as to whether the output voltage variation has occurred may be made in response to a signal transmitted from the outside (not illustrated) rather than in S102. For example, in a system in which output voltage command value Vr periodically changes, the output voltage varies with a change in the command value, so that, with a signal representing the periodical changes prepared in advance, the determination as to whether the output voltage variation has occurred may be made on the basis of the signal.

When the neural network illustrated in FIG. 4 is used in step S104, it is necessary to store an output voltage detection value obtained in the last sampling period and an output voltage detection value obtained in a sampling period before the last sampling period. Therefore, for example, in step S101, estimation unit 12 may store the output voltage detection value obtained in the last sampling period and the output voltage detection value obtained in the sampling period before the last sampling period.

The output voltage detection value (actual sampled value) may be additionally used for the determination as to whether the switching of the variation direction will occur in step S105. For example, a determination based on a comparison between the output voltage detection value in the current sampling period and the output voltage detection value in the last sampling, a determination based on a comparison between the output voltage detection value and the output voltage prediction value, or the like may be used together with the determination based on a comparison between two output voltage prediction values described with reference to step S105. Further, with only the output voltage prediction value $Vep[n+X]$ in the X-th sampling period used as the output voltage prediction value, the determination as to whether the switching of the variation direction will occur may be made on the basis of a comparison between the output voltage prediction value in the X-th sampling period estimated in the last sampling period and the output voltage prediction value in the X-th sampling period estimated in the current sampling period.

Next, details of main circuit control unit 13 will be described.

Main circuit control unit 13 controls main circuit 2 by a first control scheme under a normal condition. The first control scheme corresponds to, for example, the normal feedback control. Main circuit control unit 13 controls main circuit 2 by a second control scheme over a period from the occurrence of the variation until the determination that the switching of the output voltago variation direction of the output voltage will occur based on the output voltage prediction value. The second control scheme corresponds to, for example, the feedback control with correction. Main circuit control unit 13 controls main circuit 2 by the first control scheme and adjusts the integral term of the feedback control from the time point of the determination that the switching of the variation direction of the output voltage will occur based on the output voltage prediction value.

Switching the control scheme when the output voltage variation occurs allows an increase in speed of response of electric power conversion apparatus 1 when the output voltage variation occurs. Adjusting the integral term when returning from the switching of the control scheme makes it possible to prevent the operation after the switching from becoming unstable.

First, the normal feedback control, which is a basic operation of main circuit control unit 13, will be described.

Main circuit control unit 13 calculates a difference value SA between output voltage detection value Volt and output voltage command value Yr. Main circuit control unit 13 determines a control variable CON to be output to PWM generation unit 14 so as to make difference value SA equal to zero. Control based on control variable CON may be any control as long as difference value SA is made equal to zero, and may be classical control such as proportional integral (PI) control or proportional integral derivative (PID) control, modern control such as H-infinity control, or control using machine teaming such as fuzzy control. In the following description, an example using PID control will be given.

Next, a description will be given of how the control scheme is switched when the output voltage variation occurs.

Main circuit control unit 13 determines whether the output voltage variation has occurred on the basis of the output of estimation unit 12. When the output of estimation unit 12 is "0", main circuit control unit 13 determines that no output voltage variation has occurred and controls main circuit 2 by the first control scheme (normal feedback control). An example of a computational expression for the normal feedback control is shown in expression (A1).

[Math. 1]

$$N_{on}=N_B-K_p(N[n]-N_R)-K_I\Sigma(N[n]-N_R)-K_D(N[n]-N[n-1]) \quad (A1)$$

When the output of estimation unit 12 is other than "0", main circuit control unit 13 determines that the output voltage variation has occurred and switches the control scheme to the second control scheme. As an example of the second control scheme, feedback control with correction using the output voltage prediction value N[n+X] in the X-th sampling period transmitted as correction information Cr from estimation unit 12 will be described below. An example of a computational expression for the feedback control with correction is shown in expression (1). A proportional term PT is expressed by expression (1a). An integral term IT is expressed by expression (1b). A derivative term DT is expressed by expression (1c).

[Math. 2]

$$N_{on}=N_B-K_p\{N[n]-(N_R+\Delta N)\}-K_I\Sigma(N[n]-N_R)-K_D(N[n]-N[n-1]) \quad (1)$$

$$PT=K_p\{N[n]-(N_R+\Delta N)\} \quad (1a)$$

$$IT=K_I\Sigma(N[n]-N_R) \quad (1b)$$

$$DT=K_D(N[n]-N[n-1]) \quad (1c)$$

n denotes a current sampling period. N[n] denotes a current output voltage detection value. N[n−1] denotes an output voltage detection value in the last sampling. $N_{on}$ denotes a control variable output from main circuit control unit 13, $K_p$ denotes a proportional gain, $K_I$ denotes an integral gain, and $K_D$ denotes a derivative gain. $N_B$ and $N_R$ denotes a bias term and a reference value, respectively. Output voltage command value Vr is expressed by $N_B$ and $N_R$. $\Delta N$ denotes a correction term using the output voltage prediction value N[n+X] in the X-th sampling period and is expressed by expression (2).

[Math. 3]

$$\Delta N=N_R-N[n+X] \quad (2)$$

Under the feedback control with correction expressed by expressions (1) and (2), output voltage prediction value N[n+X] is used to correct output voltage command value Vr expressed by reference value $N_R$ and bias term $N_B$. For example, when the output voltage variation causes a decrease in the value of output voltage Vo, an operation equivalent to increasing output voltage command value Vr is performed. Alternatively, when the output voltage variation causes an increase in the value of output voltage Vo, an operation equivalent to decreasing output voltage command value Vr is performed. As described above, under the feedback control with correction, correcting output voltage command value Vr when the output voltage variation occurs allows an increase in the speed of response of the feedback control when the output voltage variation occurs.

When the output of estimation unit 12 is "0", setting the value of expression (2) to "0" makes it possible to realize the normal feedback control without changing the expression.

Expressions (1) and (2) have been shown as examples of the feedback control with correction, but other expressions may be used such as an expression using output voltage command value Vr without using bias term $N_B$ and reference value $N_R$.

A part to be corrected using the output voltage prediction value under the feedback control with correction may be other than output voltage command value Vr, and, for example, a feedback control gain such as proportional gain KP may be corrected using the output voltage prediction value.

Alternatively, the control may be performed to, without using the output voltage prediction value, switch to a predetermined feedback control gain in a period in which the occurrence of the output voltage variation is detected. The use of output voltage prediction value, however, has an advantage that a correction variable can be adjusted in accordance with the magnitude of the output voltage variation that has occurred.

Next, a description will be given of the adjustment of integral term IT of the feedback control.

According to the present embodiment, when estimation unit 12 determines that the switching of the variation direction of the output voltage will occur, main circuit control unit 13 switches the control scheme of main circuit 2 from the second control scheme (feedback control with correction) to the first control scheme (normal feedback control) and adjusts integral term IT of the feedback control.

At a timing when the switching of the variation direction of the output voltage occurs, the gradient of output voltage Vo becomes almost zero. When the gradient of output voltage Vo is zero, electric power supplied to load 5 by main circuit 2 is balanced with power consumed by load 5, which is similar to the steady state. Therefore, when it is determined that the switching of the variation direction of the output voltage will occur, main circuit control unit 13 calculates duty cycle D on the basis of an expression expressing a relationship among the input voltage, the output voltage, and duty cycle D in the steady state. Main circuit control unit 13 adjusts integral term IT of the feedback control so as to make duty cycle D equal to the value thus calculated.

An example where main circuit 2 is the step-down chopper illustrated in FIG. 2 will be described.

When the gradient of output voltage Vo is zero, no current flows through capacitor Cf of the step-down chopper, so that the magnitude of the current flowing through coil Lf becomes equal to the magnitude of the current flowing through load 5. This is due to the fact that the current flowing through coil Lf when switching element Ta is on is balanced with the current flowing through coil Lf when switching element Ta is off, so that duty cycle D can be calculated by expression (3).

[Math. 4]

$$\frac{1}{2}L(V_{in} - V_o)D = \frac{1}{2}LV_o(1 - D) \quad (3p)$$

$$D = \frac{V_o}{V_{in}} \quad (3)$$

Vin denotes the input voltage of main circuit 2, and L denotes the reactance value of coil Lf. Main circuit control unit 13 calculates, using expression (3), duty cycle D from the input voltage value and the output voltage value (the output voltage detection value or the output voltage prediction value) held in advance. Main circuit control unit 13 adjusts integral term IT of the feedback control so as to make the PWM signal generated by PWM generation unit 14 coincident with a signal with duty cycle D thus calculated.

When main circuit 2 is a step-up chopper, duty cycle D can be obtained by an expression (3a). When main circuit 2 is a step-up/down chopper, duty cycle D can be obtained by an expression (3b). Main circuit control unit 13 can adjust integral term IT of the feedback control on the basis of calculated duty cycle D at a timing when the switching of the variation direction of the output voltage occurs. Adjusting integral term IT of the feedback control makes it possible to prevent the control from becoming unstable after switching from the feedback control with correction to the normal feedback control.

[Math. 5]

$$D = \frac{V_o - V_{in}}{V_o} \quad (3a)$$

$$D = \frac{V_o}{(-V_{in} + V_o)} \quad (3b)$$

As described in the above example, when the feedback control with correction is performed using the output voltage prediction value to correct output voltage command value Vr, output voltage command value Vr that is different from the actual output voltage command value is equivalently input. As a result, an unexpected value may be set to integral term IT after the end of the feedback control with correction, so that the adjustment of integral term IT is effective.

Note that integral term IT may be adjusted a plurality of times for each output voltage variation. For example, estimation unit 12 measures the switching of the variation direction of the output voltage up to three times from when the output voltage variation occurs, and outputs an integral term adjustment command signal to main circuit control unit 13 each time the switching of the variation direction of the output voltage is detected. Main circuit control unit 13 adjusts integral term IT upon each receipt of the integral term adjustment command signal.

A value such as the value of input voltage Vin necessary for calculating the duty cycle applied to the step-down chopper may be held in advance in control device 3, or a detection unit (not illustrated) may detect input voltage Vin. Duty cycle D may be obtained on the basis of a circuit model for calculating duty cycle D.

Figure 6:
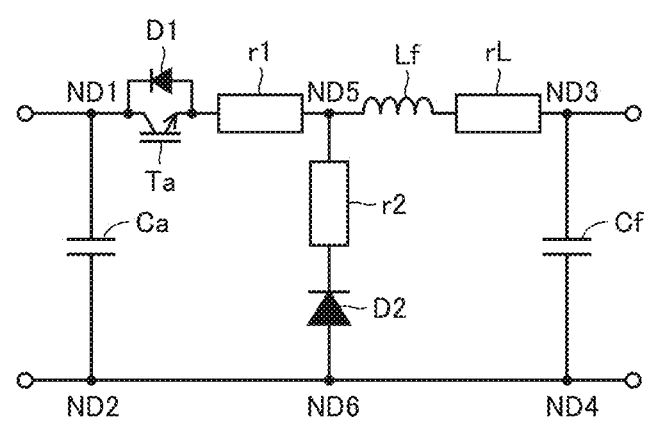
FIG. 6 is a diagram illustrating a circuit model obtained by refining the circuit illustrated in FIG. 2 in order to accurately calculate a duty cycle D applied to the step-down chopper.

FIG. 6 is a diagram illustrating a circuit model obtained by refining the circuit illustrated in FIG. 2 in order to accurately calculate duty cycle D applied to the step-down chopper.

The circuit model illustrated in FIG. 6 is a model obtained by adding a resistance component $r_1$ of switching element Ta, a resistance component $r_2$ of diode D2, and a resistance component $r_L$ of coil Lf to the circuit illustrated in FIG. 2. Duty cycle D is expressed by expression (4).

[Math. 6]

$$\frac{1}{2}L\{V_{in} - V_o - (r_L + r_1)i_o\}D = \frac{1}{2}L\{V_o + (r_L + r_2)I_O\}(1 - D) \quad (4p)$$

$$D = \frac{V_o + (r_2 + r_L)i_o}{V_{in} + (r_2 - r_1)i_o} \quad (4)$$

Output current Io in expression (4) may be detected by an output current detection circuit (not illustrated), or may be estimated from output voltage Vo that has been already detected.

The output voltage variation is caused by a variation in the resistance value of load 5, a variation due to noise, a variation with a change in the output command value, or the like. As an example, a method for estimating output current Io from output voltage Vo when the output voltage variation occurs due to a variation in the resistance value of load 5 will be described below.

First, main circuit control unit 13 calculates an output current value lost before the occurrence of the output voltage variation on the basis of an expression (5) obtained by modifying expression (4).

[Math. 7]

$$I_{ost} = \frac{D_{st}V_{inst} - V_{ost}}{r_L + r_1 + (r_1 - r_2)D_{st}} \quad (5)$$

Dst, Vinst, and Vost denotes the duty cycle applied to main circuit 2 before the occurrence of the output voltage variation, the input voltage of main circuit 2, and the output voltage of main circuit 2, respectively. Vinst may be detected by a detection circuit (not illustrated), or may be held in advance in main circuit control unit 13. Dst can be obtained from the control variable actually output from main circuit control unit 13.

Next, main circuit control unit 13 calculates a current Ic flowing through capacitor Cf when the output voltage variation occurs. Current Ic is calculated by expression (6) using output voltage detection values Vo [m−1], Vo [m] detected in sampling before and after the occurrence of the output voltage variation, sampling periods Ts, and capacitance C of capacitor Cf.

[Math. 8]

$$I_c = C \frac{V_o[m-1] - V_o[m]}{T_s} \qquad (6)$$

As shown in expression (7), main circuit control unit 13 calculates the sum of output current value lost before the occurrence of the output voltage variation and current Ic flowing through capacitor Cf when the output voltage variation occurs to obtain an output current Ioc after the occurrence of the output voltage variation.

[Math. 9]

$$I_{oc} = I_{ost} + I_c \qquad (7)$$

As shown in expression (8), main circuit control unit 13 calculates a resistance value Rc of load 5 after the occurrence of the output voltage variation on the basis of output current Ioc and output voltage detection value Vo [m] after the occurrence of the output voltage variation.

[Math. 10]

$$R_c = \frac{V_o[m]}{I_{oc}} \qquad (8)$$

Main circuit control unit 13 estimates the value of output current Io using resistance value Rc of the load and output voltage detection value Vdt after the occurrence of the output voltage variation. The computational expression for duty cycle D in FIG. 6 using the output current estimation can be expressed by expression (9).

[Math. 11]

$$D = \frac{V_o + (r_2 + r_L)\frac{V_o}{R_c}}{V_{in} + (r_2 - r_1)\frac{V_o}{R_c}} \qquad (9)$$

As described above, even when output current Io is not detected, duty cycle D can be calculated on the basis of estimated output current Io. Estimating output current Io allows duty cycle D to be obtained with high accuracy without adding a circuit that detects the output current.

According to the present embodiment, output voltage prediction value Vep calculated by estimation unit 12 can also be used in main circuit control unit 13. When output voltage prediction value Vep is used in both the determination as to whether the switching of the variation direction of the output voltage will occur made by estimation unit 12 and the feedback control with correction performed by main circuit control unit 13, it is possible to reduce computational complexity on control device 3 and to downsize and simplify the electric power conversion apparatus.

Next, the operation and effect according to the present embodiment will be described using a circuit simulation made by Myway Plus Corporation.

A simulation model of electric power conversion apparatus 1 illustrated in FIG. 1 is created. The step-down chopper illustrated in FIG. 2 is used as main circuit 2 illustrated in FIG. 1. Input voltage Vin of main circuit 2 is 20 [V], and output voltage command value Vr is 10 [V]. PID control is used as the feedback control. The neural network illustrated in FIG. 4 is used to predict the output voltage variation. Under the feedback control with correction, output voltage command value Vr is corrected using the output voltage prediction value estimated by the neural network. Load 5 is a resistive load, and the resistance value of load 5 is changed from 50 [Ω] to 20 [Ω] with the simulation running in order to reproduce the output voltage variation.

Figure 7:
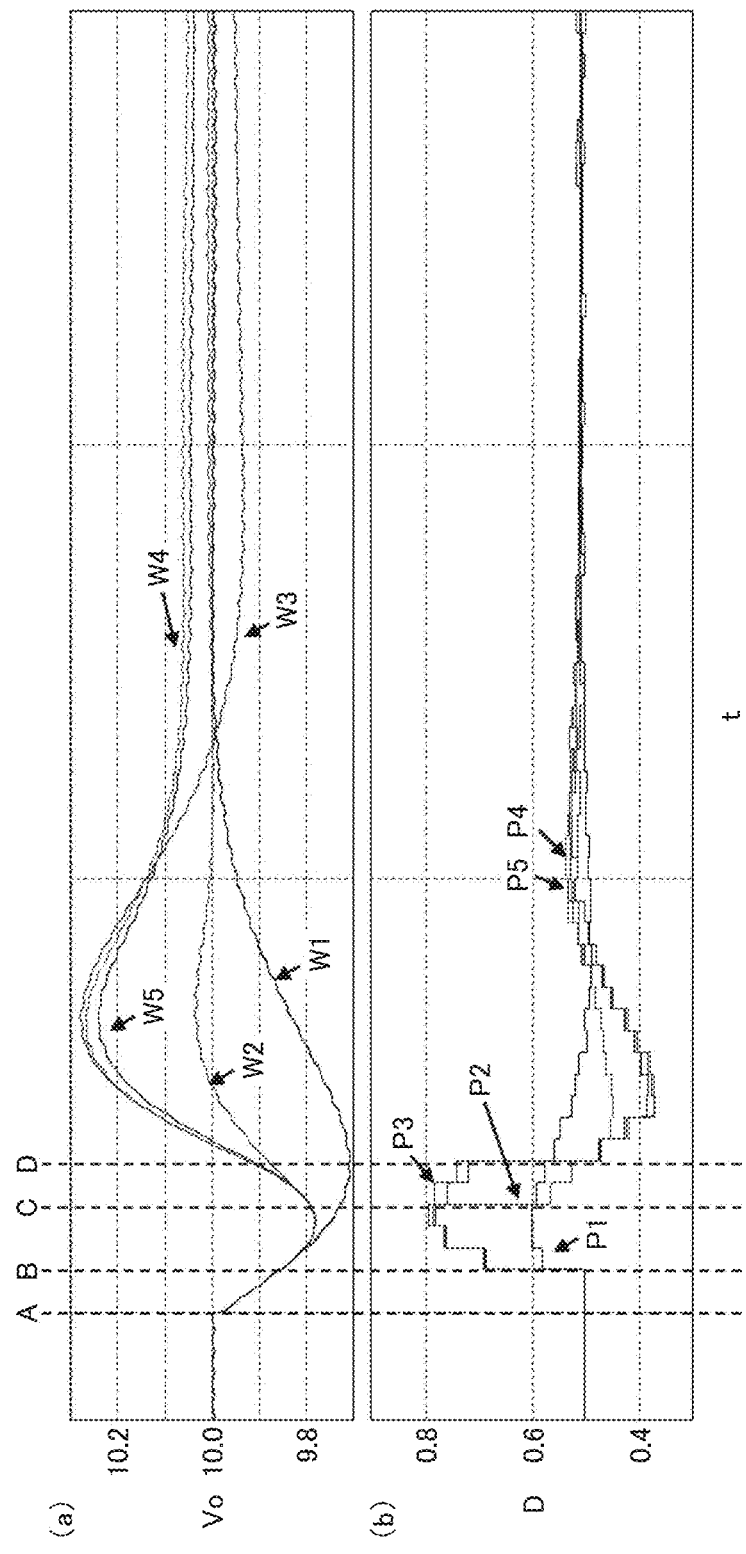
FIG. 7 is a diagram illustrating simulation waveforms.

FIG. 7 is a diagram illustrating simulation waveforms.

In FIGS. 7(a) and 7(b), the horizontal axis represents time. In FIG. 7(a), the vertical axis represents output voltage Vo. In FIG. 7(b), the vertical axis represents duty cycle D, and FIG. 7(a) illustrates waveforms W1 to W5 of output voltage Vo under five types of control methods Cm1 to Cm5. FIG. 7(b) illustrates waveforms P1 to P5 of duty cycle D under the five types of control methods Cm1 to Cm5.

Figures 8, 9:
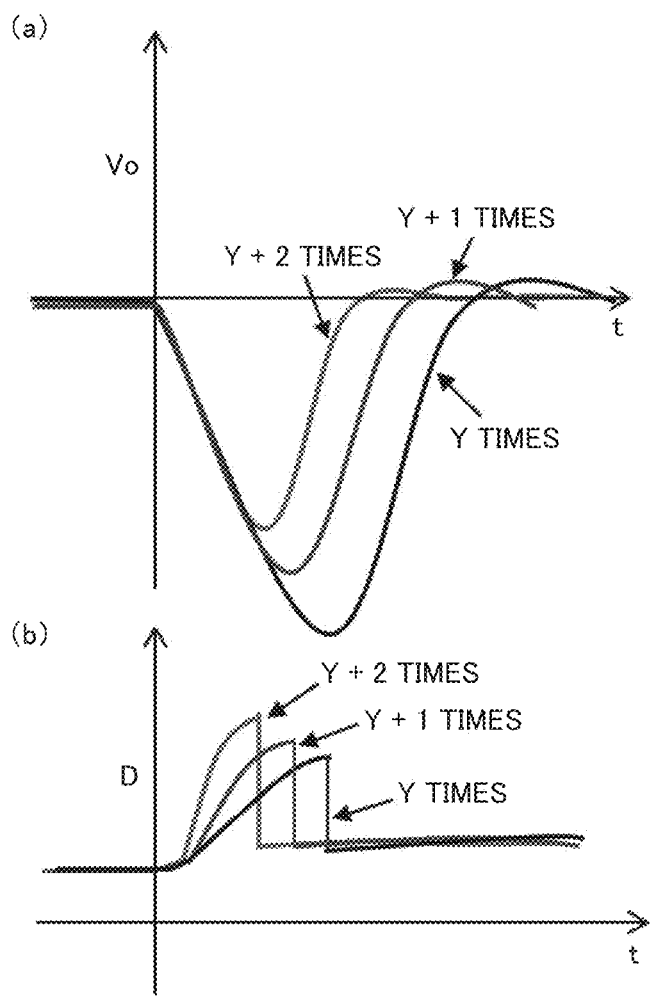
FIG. 8 is a diagram illustrating five types of control methods.
FIG. 9 is a diagram illustrating waveforms of the output voltage Vo and the duty cycle D when training is performed a plurality of times.

FIG. 8 is a diagram illustrating the five types of control methods.

Under control method Cm1, main circuit control unit 13 performs only the normal feedback control and performs none of the feedback control with correction, the adjustment of the integral term of the feedback control, and the determination as to whether the switching of the variation direction of the output voltage will occur.

Control method Cm2 is a control method according to the present embodiment. Under control method Cm2, main circuit control unit 13 performs the feedback control with correction and the adjustment of the integral term of the feedback control in addition to the normal feedback control. Further, main circuit control unit 13 compares the output voltage prediction value in the next sampling period estimated by the neural network with the output voltage prediction value in a sampling period after the next sampling period to determine whether the switching of the variation direction of the output voltage will occur.

Under control method Cm3, main circuit control unit 13 performs the feedback control with correction in addition to the normal feedback control, but does not perform the adjustment of the integral term of the feedback control. Further, main circuit control unit 13 compares the output voltage detection values in two sampling periods to determine whether the switching of the variation direction of the output voltage will occur.

Under control method Cm4, main circuit control unit 13 performs the feedback control with correction and the adjustment of the integral term of the feedback control in addition to the normal feedback control. Further, main circuit control unit 13 compares the output voltage detection values in two sampling periods to determine whether the switching of the variation direction of the output voltage will occur.

Under control method Cm5, main circuit control unit 13 performs the feedback control with correction and the adjustment of the integral term of the feedback control in addition to the normal feedback control. Main circuit control unit 13 compares the output voltage detection value in one sampling period with the output voltage prediction value in the next sampling period estimated by the neural network to determine whether the switching of the variation direction will occur when the output voltage variation occurs.

At a timing A, the resistance value of load 5 changes from 50 [Ω] to 20 [Ω]. This causes the output voltage variation, that is, a decrease in output voltage Vo.

At a timing B, under control methods Cm2, Cm3, Cm4, Cm5, it is determined that the output voltage variation has occurred, and the control scheme is switched from the normal feedback control to the feedback control with correction. It can be confirmed that duty cycle D is changed to a large value by the feedback control with correction.

At a timing C, under the control method Cm2 where the determination as to whether the switching of the variation direction will occur is made on the basis of a comparison between two output voltage prediction values, the feedback control with correction is deactivated, integral term IT of the feedback control is adjusted, and the normal feedback control is performed. Waveform W2 of output voltage Vo under control method Cm2 shows that a timing of the switching of the variation direction almost coincides with timing C. That is, it can be confirmed that the determination as to whether the switching of the variation direction will occur based on a comparison between two output voltage prediction values has been accurately made. It can be further confirmed that duty cycle D after the switching to the normal feedback control in response to the adjustment of the integral term of the feedback control does not become an abnormal value and is adjusted to a value close to a final value.

At a timing D, under control methods Cm3, Cm4, Cm5, the switching of the variation direction is determined, and the feedback control with correction is deactivated. A timing at which switching of a variation point is determined is later than a timing o actual switching of the variation point of waveforms W3 to W5 of output voltage Vo under control methods Cm3 to Cm5. It can be seen that, under control methods Cm3, Cm4, Cm5, large duty cycle D is applied for a long time as compared with control method Cm2 where the switching of the variation point is accurately determined.

Furthermore, comparing waveforms W1 to W5 and P1 to P5 under control methods Cm1 to Cm5, the following facts can be observed.

As compared with waveform W1 under control method Cm1, waveforms W2 to W5 under control methods Cm2 to Cm5 show that a variation in output voltage Vo toward the lower limit are small because large duty cycle D is applied by the feedback control with correction.

As compared with control method Cm2 where the determination as to whether the switching of the variation direction will occur is made on the basis of a comparison between two output voltage prediction values, under control methods Cm3 to Cm5 where the determination as to whether the switching of the variation direction will occur is made on the basis of the output voltage detection value, large duty cycle D is applied for a time longer than the period of the switching of the variation direction. As a result, it can be confirmed that a large overshoot voltage toward the upper limit of output voltage Vo is generated.

As compared with control method Cm3, under control methods Cm4, Cm5, integral term IT of the feedback control is adjusted. As a result, it can be confirmed that waveforms W4, W5 of output voltage Vo show that the maximum value of output voltage Vo is made lower. A difference between control methods Cm4, Cm5 is that the switching of the variation point is determined on the basis of a comparison between two output voltage detection values or a comparison between the output voltage detection value and the output voltage prediction value obtained from the neural network.

As described above, under the control method according to the present embodiment, the feedback control with correction and the adjustment of the integral term of the feedback control are performed, and the time point of the switching of the variation direction of the output voltage is determined on the basis of a comparison between two output voltage prediction values. The control method according to the present embodiment can reduce a decrease in the output voltage and prevent the voltage from overshooting. Therefore, the control method according to the present embodiment is a control method that allows the output voltage to follow the output voltage command value with delay as small as possible.

Next, how to train the neural network to be used in S104 of estimation unit 12 will be described.

The neural network is trained in advance using waveform data obtained when the output voltage variation occurs and adjusts weighting factors between units. The values (N[n], N[n− 1], N[n− 2]) of the current and past two sampling points of the waveform obtained when the output voltage variation occurs are input, and the weighting factors are adjusted using the values (N[n+X], N[n+X+1]) in the X-th sampling period and the (X+1)-th sampling period as labeled training data so as to allow the values (N[n+X], N[n+X+1]) in the X-th sampling period and the (X+1)-th sampling period to be estimated with high accuracy from the values (N[n], N[n− 1], N[n− 2]) of the current and past two sampling points.

It is desirable that a range of the output voltage waveform when the load variation used for the training of the neural network be set longer than a period from the occurrence of the variation to the timing of the switching of the load variation in order to accurately determine the occurrence of switching of the variation direction.

Although the weighting factors are learned in advance as described above, the weighting factors may be updated step by step by training the neural network and causing the neural network to make an inference simultaneously.

The training of the neural network may be performed by an external device. Estimation unit 12 acquires a waveform of the output voltage detection value when the output voltage variation occurs and outputs the waveform to the external device. The external device trains the neural network on the basis of the waveform thus received and outputs adjusted weighting factors to estimation unit 12. Estimation unit 12 sets the adjusted weighting factors in the neural network and causes the neural network to make an inference.

According to the present embodiment, main circuit 2 is controlled under the feedback control with correction for correcting the output voltage command value using the output voltage prediction value output from the neural network. Therefore, the waveform of the output voltage prediction value of the neural network is different from the actual output voltage waveform. Therefore, when a loop of the acquisition of the output voltage waveform, the training of the neural network, the prediction of the output voltage by the neural network, the feedback control with correction, the acquisition of the output voltage waveform, and the training of the neural network is repeated a plurality of times, it is possible to obtain weighting factors of the neural network that can significantly reduce a variation in the output voltage.

FIG. 9 is a diagram illustrating waveforms of output voltage Vo and duty cycle D when the training is performed a plurality of times.

In FIGS. 9(*a*) and 9(*b*), the horizontal axis represents time. In FIG. 9(*a*), the vertical axis represents output voltage Vo. In FIG. 9(*b*), the vertical axis represents duty cycle D.

With reference to FIGS. 9(*a*) and 9(*b*), a variation in output voltage Vo can be reduced when the training is performed (Y+1) times (Y is an integer) as compared with when the training is performed Y times. Furthermore, it can be confirmed that a variation in output voltage Vo can be reduced when the training is performed (Y+2) times as compared with when the training is performed (Y+1) times.

Note that even when the training is performed a plurality of times, it is desirable that the determination as to whether the switching of the variation direction of the output voltage will occur based on a comparison between the output voltage prediction value in the X-th sampling period and the output voltage prediction value in the (X+1)-th sampling period and the adjustment of the integral term be performed. This makes it possible to prevent the operation of electric power conversion apparatus 1 from becoming unstable after the end of the feedback control with correction.

Second Embodiment

Figure 10:
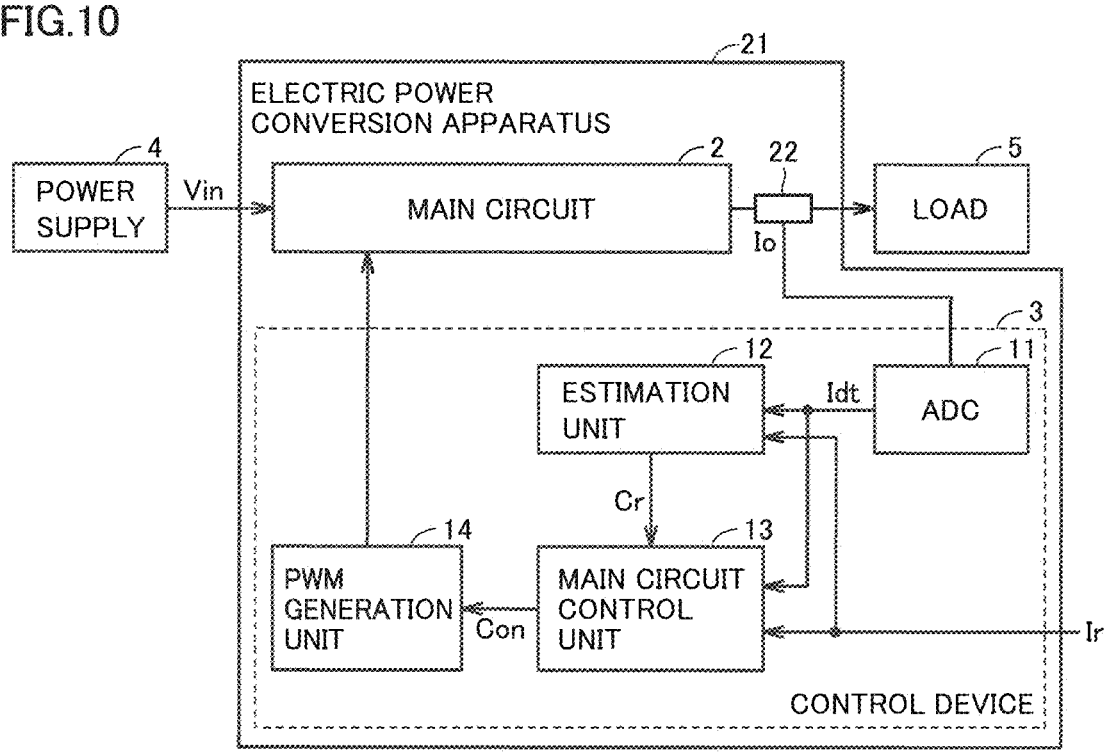
FIG. 10 is a diagram illustrating a configuration of an electric power conversion apparatus 21 according to a second embodiment.

FIG. 10 is a diagram illustrating a configuration of an electric power conversion apparatus 21 according to a second embodiment.

Electric power conversion apparatus 21 illustrated in FIG. 10 is different from electric power conversion apparatus 1 illustrated in FIG. 1 in the following points. Electric power conversion apparatus 21 illustrated in FIG. 10 includes an output current detection unit 22 that detects output current Io instead of output voltage detection unit 6, and main circuit control unit 13 receives an output current command value Ir instead of output voltage command value Vr. Note that, in FIG. 10, components having the same configuration and operation as illustrated in FIG. 1 are denoted by the same reference numerals as illustrated in FIG. 1.

Electric power conversion apparatus 1 according to the first embodiment controls output voltage Vo in accordance with output voltage command value Vr to reduce a variation in the output voltage. Electric power conversion apparatus 21 according to the second embodiment controls output current Io in accordance with output current command value Ir to reduce a variation in the output current.

A difference between the control of output voltage Vo and the control of output current Io is as follows. Under the output voltage control, when load 5 changes from 50 [Ω] to 20 [Ω], output voltage Vo varies downward. Under the output current control, when load 5 changes from 50 [Ω] to 20 [Ω], output current Io varies upward. The behavior when the same load variation occurs is opposite. This is because there is a difference that a load having a smaller resistance value becomes a heavy load under the voltage control, but a load having a larger resistance value becomes a heavy load under the current control.

As described above, the electric power conversion apparatuses according to the first and second embodiments each control, on the basis of the detection value of the output voltage or output current of the main circuit, the main circuit by the feedback control with correction over a period from the detection of the occurrence of the output voltage variation or output current variation until the switching of the variation direction of the output voltage. The feedback control with correction allows an increase in the speed of response of the electric power conversion apparatus, so that a variation range of the output voltage variation or output current variation can be reduced. This in turn allows an increase in performance of the electric power conversion apparatus and allows reductions in size and cost of an output filter of the main circuit.

The electric power conversion apparatuses according to the first and second embodiments each determine the switching of the variation direction of the output voltage variation or output current variation using the output voltage prediction values or output current prediction values in the X-th sampling period and the (X+1)-th sampling period. The use of such prediction values makes it possible to accurately determine the occurrence of the switching of the variation direction without being affected by delay elements such as a detection delay and a control delay. Such accurate determination allows the duration of the feedback control with correction to be appropriately set. This makes it possible to prevent the output voltage or output current generated under the feedback control with correction from overshooting over a period longer than a necessary period, so that the stability of the electric power conversion apparatus can be increased.

The electric power conversion apparatuses according to the first and second embodiments each perform the feedback control with correction by correcting the output voltage command value or the output current command value using the output voltage prediction value or the output current prediction value. The use of the output voltage prediction value or the output current prediction value makes it possible to provide a correction value suitable for the magnitude of the generated output voltage variation or output current variation, so that it is possible to increase the speed of response and stability of the electric power conversion apparatus.

The electric power conversion apparatuses according to the first and second embodiments each adjust the integral term of the feedback control at a timing when the feedback control with correction is switched to the normal feedback control. The integral term is adjusted at a timing when the variation direction of the output voltage variation or output current variation is switched, so that it is possible to use a simple expression of the duty cycle in the steady state of the main circuit. This allows a reduction in computational complexity on the control device, so that it is possible to reduce the size and cost of the control device. Further, adjusting the integral term of the feedback control at the timing when the feedback control with correction is switched to the normal feedback control makes it possible to prevent a variation in the output voltage or output current generated when a value largely deviating from an ideal value is set to the integral term after the switching, so that the stability of the electric power conversion apparatus can be increased.

The electric power conversion apparatuses according to the first and second embodiments each perform both the feedback control with correction and the determination of the switching of the variation direction of the output voltage variation or output current variation using the output voltage prediction values or output current prediction values in the X-th sampling period and the (X+1)-th sampling period. This allows a reduction in computational complexity on the control device, so that it is possible to reduce the size and cost of the control device.

Control device 3 described in the first and second embodiments may have a corresponding operation implemented via hardware or software of a digital circuit.

Figure 11:
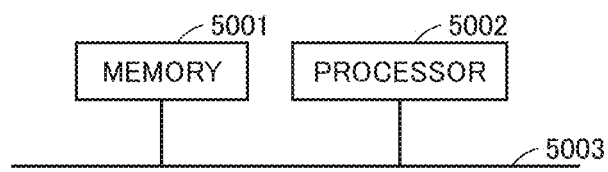
FIG. 11 is a diagram illustrating a configuration of a control device 3 having its functionality implemented via software.

FIG. 11 is a diagram illustrating a configuration of a control device 3 having its functionality implemented via software. Control device 3 includes a processor 5002 and a memory 5001, both connected to a bus 5003. Processor 5002 executes a program stored in memory 5001.

It should be understood that the embodiments disclosed herein are illustrative in all respects and not restrictive. The scope of the present disclosure is defined by the claims rather than the above description and is intended to include the claims, equivalents of the claims, and all modifications within the scope.

REFERENCE SIGNS LIST 1, 21: electric power conversion apparatus, 2: main circuit, 3: control device, 4: power supply, 5: load, 6: output voltage detection unit, 12: estimation unit, 13: main circuit control unit, 14: PWM generation unit, 22: output current detection unit, 5001: memory, 5002: processor, 5003: bus, D1, D2: diode, Lf: coil, Ta: switching element

The invention claimed is:

1. An electric power conversion apparatus comprising:
a main circuit including a switching element, the main circuit to convert electric power input to the main circuit and supply a result of the conversion to a load;
a detector to detect an output value of the main circuit; and
a controller to control the main circuit, wherein
the output value of the main circuit is an output voltage of the main circuit or an output current of the main circuit,
the controller switches a control scheme of the main circuit from a first control scheme to a second control scheme at a first time point when the output value starts to vary,
the controller predicts, on the basis of a detection value of the detector, a prediction value of the output value of the main circuit, which is an output value of the main circuit at a future time point that will occur after the first time point,
the controller switches the control scheme of the main circuit from the second control scheme to the first control scheme at a second time point when a determination is made, based on the prediction value of the output value of the main circuit, that switching of a variation direction of the output value will occur, and
the first control scheme is feedback control under which the output value is controlled to follow a command value.

2. The electric power conversion apparatus according to claim 1, wherein
the controller predicts, on the basis of the detection value, output values of the main circuit in two sampling periods after a detection time point of the detection value and determines that switching of the variation direction of the output value will occur on the basis of prediction values of the output values of the main circuit in the two sampling periods.

3. The electric power conversion apparatus according to claim 1, wherein
the controller predicts, on the basis of the detection value, an output value of the main circuit at a timing after a detection time point of the detection value,
the second control scheme is feedback control with correction under which a correction is applied to the feedback control in the first control scheme on the basis of a prediction value of the output value of the main circuit.

4. The electric power conversion apparatus according to claim 3, wherein
a command value of the feedback control with correction is a command value corrected on the basis of the prediction value of the output value of the main circuit.

5. The electric power conversion apparatus according to claim 3, wherein
a control gain of the feedback control with correction is a control gain corrected on the basis of the prediction value of the output value of the main circuit.

6. The electric power conversion apparatus according to claim 3, wherein
the controller calculates a duty cycle of the main circuit at the second time point and adjusts an integral term of the feedback control on the basis of the duty cycle.

7. The electric power conversion apparatus according to claim 6, wherein
the controller calculates the duty cycle of the main circuit at the second time point in accordance with an expression expressing a relationship among an input voltage, an output voltage, and the duty cycle in a steady state.

8. The electric power conversion apparatus according to claim 1, wherein
the controller detects a variation in the output value on the basis of the detection value of the detector.

9. The electric power conversion apparatus according to claim 2, wherein
the controller predicts, on the basis of the detection value in a current sampling period, the detection value in a last sampling period, and the detection value in a sampling period before the last sampling period, an output value in a next sampling period and an output value in a sampling period after the next sampling period.

10. The electric power conversion apparatus according to claim 3, wherein
the feedback control is proportional-integral (PI) control or proportional-integral-derivative (PID) control.

11. The electric power conversion apparatus according to claim 2, wherein
the controller predicts the output value of the main circuit at a timing after the detection time point of the detection value on the basis of the detection value using a machine learning model that has been trained.

12. The electric power conversion apparatus according to claim 11, wherein the machine learning model is a neural network.

13. The electric power conversion apparatus according to claim 1, wherein the switching of the variation direction of the output value corresponds to a condition where the output value of the main circuit has continuously varied a plurality of times in a direction in which a difference between the output value of the main circuit and a command value increases.

14. The electric power conversion apparatus according to claim 1, wherein the switching of the variation direction of the output value corresponds to a condition where a difference between the output value of the main circuit and a command value is greater than or equal to a threshold value.

15. An electric power conversion apparatus comprising:
a main circuit including a switching element, the main circuit to convert electric power input to the main circuit and supply a result of the conversion to a load;

a detector to detect an output value of the main circuit; and a controller to control the main circuit, wherein the output value of the main circuit is an output voltage of the main circuit or an output current of the main circuit, and the controller switches a control scheme of the main circuit from a first control scheme to a second control scheme at a first time point when the output value starts to vary, the controller predicts, on the basis of a detection value of the detector, a prediction value of the output value of the main circuit, the controller switches the control scheme of the main circuit from the second control scheme to the first control scheme at a second time point when a determination is made, based on the prediction value of the output value of the main circuit, that switching of a variation direction of the output value will occur, the controller predicts, on the basis of the detection value, an output value of the main circuit at a timing after a detection time point of the detection value, the first control scheme is feedback control under which the output value is controlled to follow a command value, and the second control scheme is feedback control with correction under which a correction is applied to the feedback control in the first control scheme on the basis of a prediction value of the output value of the main circuit.

* * * * *